US009697010B2

(12) United States Patent
Paul et al.

(10) Patent No.: US 9,697,010 B2
(45) Date of Patent: Jul. 4, 2017

(54) USER SELECTABLE OPERATING SYSTEMS (71) Applicant: Microsoft Corporation, Redmond, WA (US)

(72) Inventors: Jeffrey M. Paul, Kirkland, WA (US); Ross F. Hewit, Sammamsih, WA (US); Robert Zhu, Redmond, WA (US); Heonmin Lim, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 14/225,096

(22) Filed: Mar. 25, 2014

(65) Prior Publication Data

US 2015/0277929 A1 Oct. 1, 2015

(51) Int. Cl.
*G06F 9/44* (2006.01)

(52) U.S. Cl.
CPC ................... *G06F 9/441* (2013.01)

(58) Field of Classification Search
CPC .............. G06F 9/441; G06F 9/4406
See application file for complete search history.

(56) References Cited

U.S. PATENT DOCUMENTS

| 6,401,183 | B1 | 6/2002 | Rafizadeh |
| 6,807,665 | B2 | 10/2004 | Evans et al. |
| 6,920,555 | B1 * | 7/2005 | Peters ............... G06F 9/4451 711/173 |
| 6,928,542 | B2 | 8/2005 | Wen et al. |
| 7,136,994 | B2 | 11/2006 | Zimmer et al. |
| 7,533,350 | B2 | 5/2009 | Vineyard et al. |
| 7,779,243 | B2 | 8/2010 | Adrangi et al. |
| 7,818,736 | B2 | 10/2010 | Appavoo et al. |
| 8,090,938 | B2 | 1/2012 | Xu |
| 8,762,699 | B1 | 6/2014 | Streuter et al. |
| 8,799,631 | B2 | 8/2014 | Batwara et al. |
| 8,868,899 | B2 | 10/2014 | Galicia et al. |
| 8,898,443 | B2 | 11/2014 | Reeves et al. |

(Continued)

FOREIGN PATENT DOCUMENTS

| CN | 102045449 A | 5/2011 |
| EP | 1876528 A2 | 1/2008 |
| WO | 2013142465 A1 | 9/2013 |

OTHER PUBLICATIONS

Dan Gookin, Mar. 2008, http://www.dummies.com/how-to/content/how-to-use-unallocated-drive-space-in-windows.html.*

(Continued)

*Primary Examiner* — Zahid Choudhury
*Assistant Examiner* — Siamak S Hefazi
(74) *Attorney, Agent, or Firm* — Rainier Patents, P.S.

(57) ABSTRACT

This patent relates to user devices that have user-selectable operating systems. One implementation can include primary storage having multiple compressed operating systems stored thereon in inoperable form. This implementation can also include a processor configured to execute a multi-option boot loader configured to receive a user selection of an individual operating system. The multi-option boot loader is configured to install a file folder structure on the primary storage in a configuration specific to the individual operating system and to install the individual operating system in an operable form on the primary storage relative to the file folder structure.

20 Claims, 8 Drawing Sheets (56) References Cited

U.S. PATENT DOCUMENTS

| | | | |
|---|---|---|---|
| 9,003,173 B2* | 4/2015 | Baribault | G06F 9/441 |
| | | | 713/1 |
| 9,010,641 B2 | 4/2015 | Qu et al. | |
| 9,021,244 B2* | 4/2015 | Bobzin | G06F 21/575 |
| | | | 713/1 |
| 2002/0169950 A1 | 11/2002 | Esfahani et al. | |
| 2005/0182922 A1 | 8/2005 | Guo et al. | |
| 2007/0011444 A1* | 1/2007 | Grobman | G06F 9/44547 |
| | | | 713/2 |
| 2007/0011674 A1* | 1/2007 | Joo | G06F 9/4406 |
| | | | 717/174 |
| 2007/0162901 A1 | 7/2007 | Oh | |
| 2009/0089569 A1 | 4/2009 | Baribault et al. | |
| 2011/0098583 A1 | 4/2011 | Pandia et al. | |
| 2011/0126216 A1 | 5/2011 | Galicia et al. | |
| 2012/0084792 A1 | 4/2012 | Benedek et al. | |
| 2012/0102314 A1 | 4/2012 | Zheng et al. | |
| 2012/0191961 A1 | 7/2012 | Wu et al. | |
| 2014/0149647 A1 | 5/2014 | Guo et al. | |
| 2015/0277934 A1 | 10/2015 | Zhang et al. | |
| 2015/0277986 A1 | 10/2015 | Zhang et al. | |

OTHER PUBLICATIONS

Aloni, Tal, "[Tool] SparseConverter v1.0.0", Android Development and Hacking, XDA Forums, May 13, 2014, Available at: <<http://forum.xda-developers.com/showthread.php?t=2749797>>, 6 pages.
Asad, Taimur, "Dual Boot Windows Mobile and Android," Redmond Pie, Jan. 30, 2010, Available at: <<http://www.redmondpie.com/how-to-dual-boot-windows-mobile-and-android-on-windows-phone-9140407/>>, 4 pages.
Cawley, Christian, "HTC HD2 Guide to Dual Boot Android and Windows Phone 7," Bright Hub Inc., Published Aug. 18, 2011, retrieved at: <<http://www.brighthub.com/mobile/windows-mobile-platform/articles/123415.aspx>>, 3 pages.
Deniss, "WinPad A-97 Tablet PC, Tablet Dual-Boot Windows 7 and Android 2.2", Apr. 1, 2011, retrieved at: <<http://chinitech.com/en/tablet-pc/tablette-winpad-a-97-tablette-dual-boot-windows-7-et-android-2-2/>>, 3 pages.
Gorman, Michael, "Canonical gives Developers a Preview of a Dual-Booting Ubuntu and Android Future", Published on: Dec. 23, 2013, retrieved at: <<http://www.engadget.com/2013/12/23/canonical-dual-boot-android-ubuntu-developer-preview/>>, 4 pages.
Hruska, Joel, "Microsoft and Google Kill off Intel-Asus Dual OS Tablet Effort," Mar. 14, 2014, retrieved at: <<http://www.extremetech.com/computing/178552-microsoft-google-kill-off-intel-and-asus-dual-os-tablet-effort>>, 11 pages.
Martin, Taylor, "The Beauty of Choice: Windows Phone on Android Hardware", Mar. 6, 2014, retrieved at: <<http://pocketnow.com/2014/03/06/windows-phone-on-android-hardware>>, 13 pages.
Minasi et al., "Inside OS/2 Warp, Version 3," Chapter 2 (Installation); Chapter 6 (File Systems); Chapter 20 (Performance and Tuning); SETBOOT, New Riders Publishing, Dec. 31, 1994, 12 Pages.
Savov, Vlad, "The Transformer Book Duet Combines Windows with Android, Tablet with Laptop", Jan. 6, 2014, retrieved at: <<http://www.theverge.com/2014/1/6/5280850/asus-transformer-book-duet-hands-on-ces-2014>>, 3 pages.
Sims, Gary, "Phones that can Run Two Operating Systems Simultaneously Coming by the End of 2013", Nov. 27, 2012, retrieved at: <<http://www.androidauthority.com/phones-that-can-run-two-operating-systems-simultaneously-134586/>>, 10 pages.
Sun et al., "Supporting Multiple OSes with OS Switching", Proceedings of USENIX Annual Technical Conference, Jun. 17, 2007, pp. 357-362, 6 pages.
"Use the Flashing Tools Provided by Microsoft", Dec. 15, 2014, retrieved at: <<https://dev.windowsphone.com/en-US/OEM/docs/Phone_Bring-Up/Use_the_flashing_tools_provided_by_Microsoft>>, 5 pages.
Warren, Tom, "Ativ Q: A First Look at Samsung's New Windows 8 and Android Hybrid Laptop", Jun. 20, 2013, retrieved at: <<http://www.theverge.com/2013/6/20/4449116/samsung-ativ-q-windows-8-android-hybrid-hands-onphotos-video>>, 3 pages.
International Search Report and Written Opinion mailed Jun. 10, 2015 from PCT Patent Application No. PCT/US2015/021623, 12 pages.
Zhang et al., "Dynamic Partition Dual Boot Mobile Phone Device," U.S. Appl. No. 14/688,401, filed Apr. 16, 2015, 60 pages.
Zhang et al., "One Time Dual Boot Mobile Phone Device," U.S. Appl. No. 14/688,228, filed Apr. 16, 2015, 60 pages.
PCT Demand under Article 31 and Response filed Sep. 24, 2015 from PCT Patent Application No. PCT/US2015/021623, 14 pages.
Second Written Opinion mailed Mar. 29, 2016 from PCT Patent Application No. PCT/US2015/021623, 7 pages.
Fingas, Jon, "TomTom's new GPS watches track your heart rate without a chest strap", retrieved at http://www.engadget.com/2014/04/03/tomtom-cardio-gps-watches/, Apr. 3, 2014, 3 pages.
Goode, Lauren, "Samsung's New Gear Fit Needs to Work on the 'Fit' Part", retrieved at <<http://recode.net/2014/04/08/samsungs-new-gear-fit-needs-to-work-on-the-fit-part/>>, Apr. 8, 2014, 9 pages.
NDTV Correspondant, "Samsung Gear Fit, Gear 2 and Gear 2 Neo go on sale worldwide", retrieved at <<http://gadgets.ndtv.com/wearables/news/samsung-gear-fit-gear-2-and-gear-2-neo-go-on-sale-worldwide-507220>>, Apr. 11, 2014, 2 pages.
Poeter, Damon, "Meet Simband, Samsung's Next-Gen Health Tracker", PC Mag Website, retrieved at <<http://www.pcmag.com/article2/0,2817,2458663,00.asp>>, May 28, 2014, 18 pages.
Communication pursuant to Rules 161(1) and 162 EPC mailed Nov. 2, 2016 from European Patent Application No. 15715032.7, 2 pages.
Non-Final Office Action mailed Jan. 9, 2017 from U.S. Appl. No. 14/688,401, 19 pages.
Non-Final Office Action mailed Jan. 6, 2017 from U.S. Appl. No. 14/688,228, 26 pages.
Notice of Allowance mailed May 24, 2017 from U.S. Appl. No. 14/688,401, 8 pages.
Response filed Apr. 6, 2017 to the Non-Final Office Action mailed Jan. 6, 2017 from U.S. Appl. No. 14/688,228, 11 pages.
Response filed Apr. 10, 2017 to the Non-Final Office Action mailed Jan. 9, 2017 from U.S. Appl. No. 14/688,401, 9 pages.
Response filed May 12, 2017 to the Communication pursuant to Rules 161(1) and 162 EPC mailed Nov. 2, 2016 from European Patent Application No. 15715032.7, 17 pages.

* cited by examiner

USER SELECTABLE OPERATING SYSTEMS

BACKGROUND

Traditionally, computing devices have included a single operating system to run on the device. Some knowledgeable users could configure the device to boot to either of two operating systems. However, such configurations required changes to the operating systems and hard partitioning to separate the operating systems from one another. Further, multiple operating systems occupied large amounts of storage space that was then unavailable to the user. Further, the configurations created security issues for the device and operating systems. As such, a user sacrificed a lot for the option of multiple operating systems on their device or they accepted a lack of choice offered by a device having a single operating system.

SUMMARY

This document relates to user devices that have user-selectable operating systems. One implementation relates to a device that has primary storage, such as a solid state hard drive or a hard disk drive. The primary storage can have multiple compressed operating systems stored thereon in inoperable form or version. This implementation can also include a processor configured to execute a multi-option boot loader. The multi-option boot loader can be configured to receive a user selection of an individual operating system. The multi-option boot loader can be configured to install a file folder structure on the primary storage in a configuration specific to the individual operating system and to install the individual operating system in an operable form on the primary storage relative to the file folder structure.

Another implementation can include a display, storage, and a processor. The processor can be configured to cause a graphical user interface (GUI) to be presented on the display that lists multiple operating systems stored in binary form on the storage. The GUI can allow a user to select to install an operational form of an individual operating system on the storage. The processor can cause another GUI to be presented on the display that allows the user to select to install an operational form of another of the multiple operating systems on the device and to delete the operational form of the individual operating system.

A further implementation can include a display, a processor, storage, and at least two operable operating systems installed on the storage. The processor can be configured to receive a user selection of an individual operating system and to delete others of the at least two operating systems. The processor can also format a portion of the storage dedicated to the deleted operating systems to user data storage.

This Summary is provided to introduce a selection of concepts in a simplified form that are further described below in the Detailed Description. This Summary is not intended to identify key or essential aspects of the claimed subject matter, nor is it intended to be used as an aid in determining the scope of the claimed subject matter.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

The present techniques allow a manufacturer or other supplier to install multiple operating systems on a computing device or "device". The end user (or someone acting on their behalf) can select which operating system to utilize on the device. While applicable to any type of device, the present concepts are especially applicable to storage constrained devices, such as tablets, smart phones, and/or wearable smart devices, among others. Storage constrained devices tend to have a relatively small amount of storage. In traditional configurations, having multiple operating systems on a device greatly decreased the amount of storage available for the user to store user data, such as music, pictures, and/or video. As a result, the convenience of being able to select from multiple operating systems was outweighed by the greatly reduced user storage. The present implementations can overcome this tradeoff and offer the choice of multiple operating systems to the user with very little decrease in data storage available to the user. The explanation that follows starts with several scenario examples, followed by hardware examples, and finally method examples.

Use Case Scenarios

Figures 1, 2:
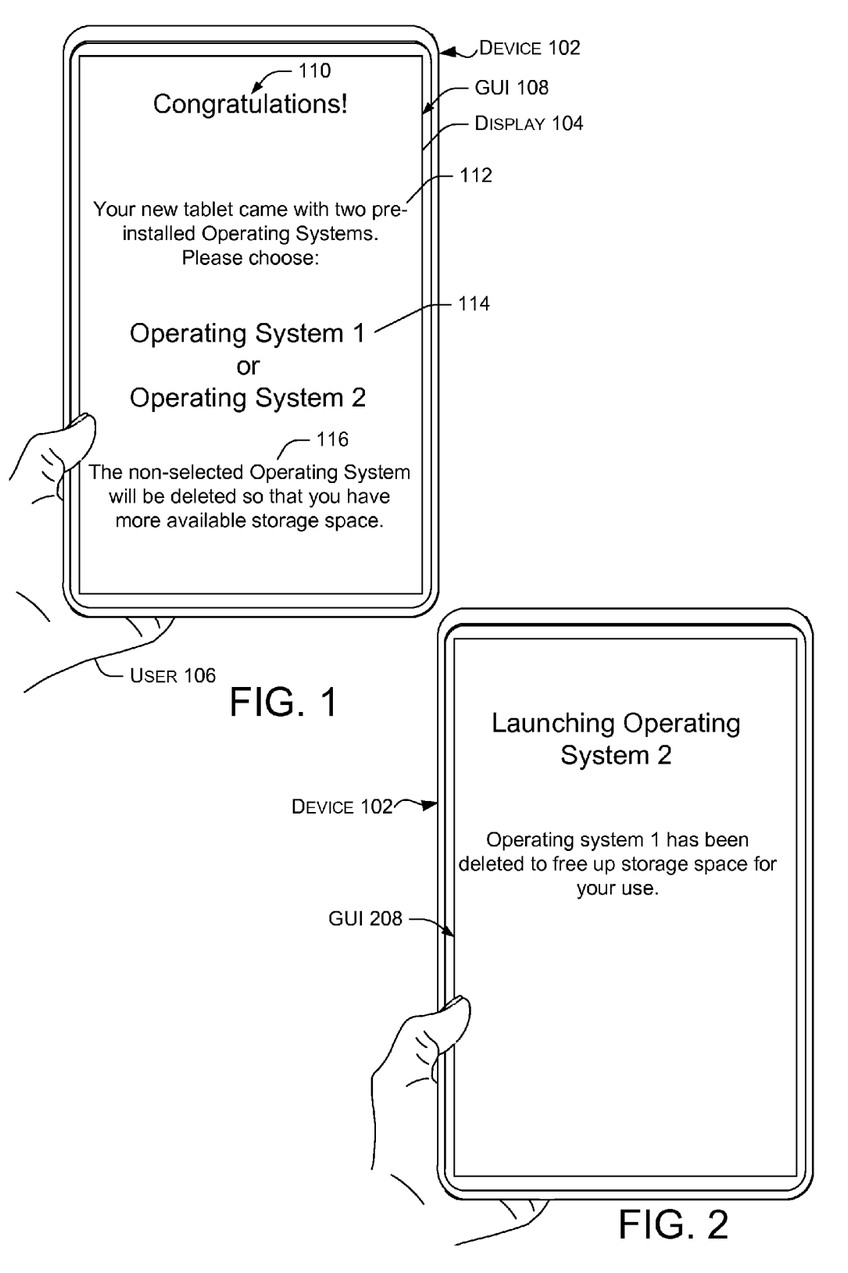
FIGS. 1-9 are examples of user operating system selection scenarios in accordance with some implementations of the present concepts.

FIGS. 1-2 collectively show a first use case scenario involving a device 102. In this example the device 102 is manifest as a tablet type device having a display 104. The device scenario can involve an end user 106 (e.g., purchaser) of a device 102. In FIG. 1 when the user powers up the device, a graphical user interface (GUI) 108 is presented to the user. The GUI includes a multiple operating system message 110 that is presented to the user. The message indicates at 112 that the tablet came with two pre-installed operating systems. The GUI lists the operating systems (e.g., operating system 1 and operating system 2) at 114 and asks the user to select one of the operating systems. The message explains to the user at 116 that the non-selected operating system will be deleted so that the user will have more available storage space on the device. Assume for purposes of explanation that the user selects operating system 2. Though not shown, another GUI may be generated at this point that asks the user to confirm their selection and/or explains any ramifications of the selection.

FIG. 2 shows a subsequent GUI 208 that indicates to the user that operating system 2 is being launched on the device and that operating system 1 has been deleted from the device to free up storage space for the user. To summarize, this configuration can allow the device to come pre-installed with different operating systems. The user can select an individual operating system. The other operating systems can be deleted so that portions of storage that had been occupied by the deleted operating systems can be configured for use by the user. At this point, the device 102 can function with the selected operating system in the same manner as if only the selected operating system had been pre-installed on the device. As such, the manufacturer can make a single device that has multiple operating system options and the user can configure the device as desired. The end result can be thought of as a generic device that can function as though it was built to the user's specifications (e.g., how the user wanted it).

FIGS. 3-9 collectively illustrate another multi-option scenario. This scenario is described relative to a device 302. In this case, device 302 is manifest as a smart phone that has a display 304 and hardware buttons 306. In this case, there are three hardware buttons 306(1), 306(2), and 306(3). The hardware buttons 306 can function in various capacities, such as a power button, volume buttons, etc. In some configurations, the hardware buttons may be available for use during start-up when 'soft keys' are not available. In this example, the user could activate the power button to see a start-up GUI 308. Note that other device configurations can have different numbers of hardware buttons or lack hardware buttons entirely and instead have other mechanisms for the user to control the device.

Figures 3, 4, 5, 6:
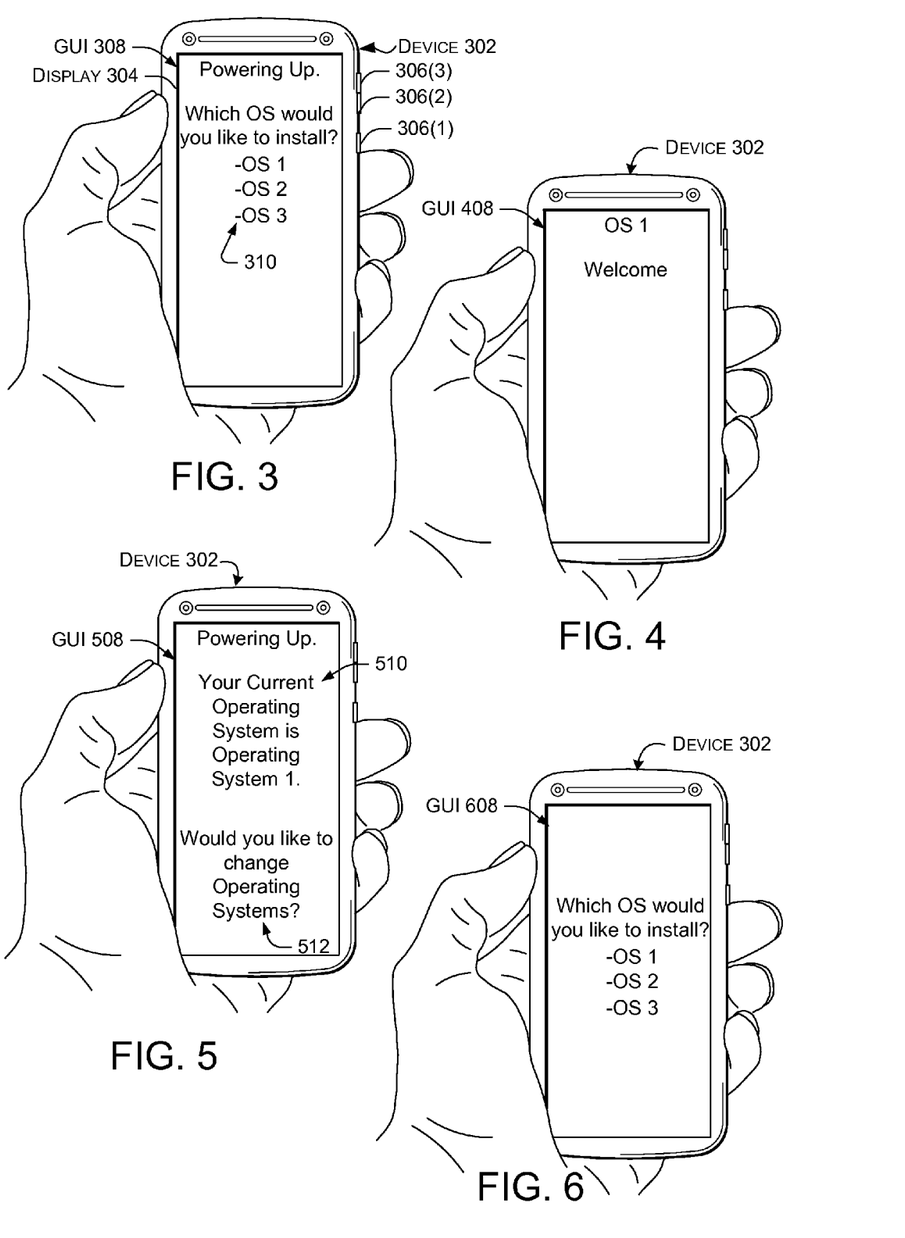

GUI 308 indicates to the user that the device is powering up and that the user can select one of three operating systems (OS1-OS3) to install on the device as indicated at 310. Assume for purposes of explanation that the user selects operating system 1 using one or more of hardware buttons 306. FIG. 4 shows a GUI 408 generated by operating system 1. At this point, operating system 1 launches normally (e.g., as though operating system 1 is the only operating system on the device). However, in this case, the other operating systems (e.g., OS2 and OS3) are not deleted from the device. Instead, OS2 and OS3 can be maintained on the device in a compressed inoperable form that takes relatively little space on the device (such as one gigabyte or less, for example).

FIG. 5 shows a subsequent GUI 508 where the user once again powers on the device 302. In this case, the GUI indicates at 510 that the current operating system is operating system 1. The GUI also asks the user at 512 whether the user would like to switch operating systems. For purposes of example, assume that the user indicates that he/she wants to try another operating system.

Figures 7, 8, 9:
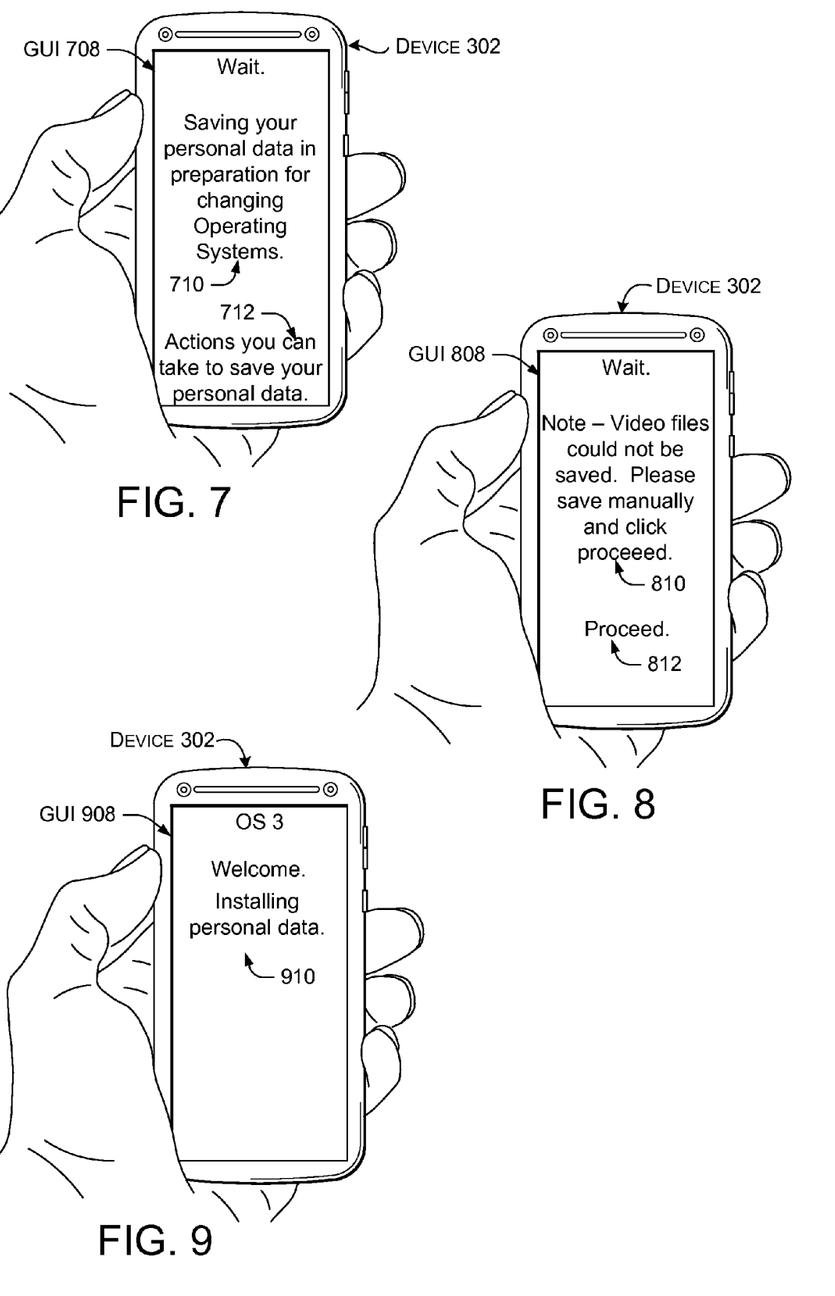

FIG. 6 shows a subsequent GUI 608 which allows the user to select from the available operating systems (e.g., OS1-OS3). For purposes of explanation, assume that the user selects OS3. FIG. 7 shows another GUI 708 that indicates that the device is taking actions to save the user's personal data in preparation for changing operating systems at 710. Briefly, in this context the user's personal data can include personal settings associated with the prior operating system and/or personal content, such as documents, media, etc. In some cases, the personal data can be thought of as part of configuration data associated with an individual operating system. GUI 708 also offers the user the opportunity to learn about actions the user can take to save his/her personal data at 712. For example, the user could click on this section and another GUI could be generated that explains how and where the user can back up specific personal data. For instance, the user could back up their personal data to secondary storage, such as a flash storage device (e.g., secure digital (SD) card) and/or cloud storage, among others.

FIG. 8 shows another GUI 808 that is directed to protecting the user's personal data during the operating system change. This GUI represents that actions can be taken to protect the user's personal data during operating system switches. In this example, GUI 808 indicates at 810 that specific personal data, (in this case, video files) could not be saved. The GUI requests that the user manually back up the specified data before the device proceeds with the operating system change at 812.

FIG. 9 shows a subsequent GUI 908 that is launching the selected OS3. At 910 the GUI indicates that the user's personal data that was saved in FIGS. 7-8 is being associated with OS3. From this point forward, OS3 can operate in a normal fashion.

In summary, FIGS. 3-9 illustrate a device that can maintain compressed inoperable forms of multiple operating systems. The user can select an individual operating system for installation on the device (e.g., in operable form). The user can subsequently switch to a different operating system if desired. This configuration allows a single device (e.g. product) to satisfy many different users. Further, an individual user can select (and reselect) individual operating systems to utilize on the device while sacrificing very little storage (for instance less than 1 gigabyte out or 32 gigabytes of primary storage). The device 302 can be configured to automatically allow the user to select (e.g., change) operating systems under certain circumstances, such as at cold start-up. Alternatively or additionally, after the first user selection, the user may decide to bring up the operating system selection GUI, such as by making a selection in a 'settings' folder or similar user control feature.

Figure 10:
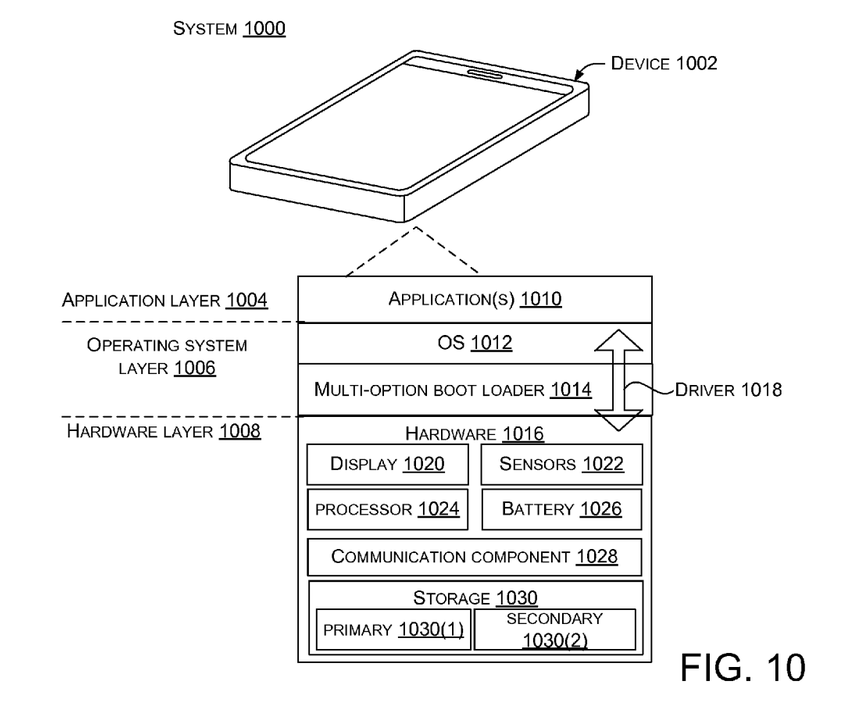
FIG. 10 is an example of a system that can implement the user selectable operating system concepts.

FIG. 10 shows a system 1000 that is configured to allow the user to select from multiple operating systems. System 1000 includes a device 1002 that is similar to devices 102 and 302 described above. In some configurations, device 1002 can be characterized as having an application layer 1004, an operating system layer 1006, and a hardware layer 1008. One or more application(s) 1010 can run over on an operating system (OS) 1012. A multi-option boot loader 1014 can allow the user to select an individual operation system for operation on the device. The operating system can interact with hardware 1016 via driver 1018. (Note that operating systems can each have their own drivers. For instance, a display driver for a first operating system may not function with a second operating system).

Examples of hardware 1016 can include a display 1020 (analogous to displays 104 and 304 of FIGS. 1 and 3, respectively), sensors 1022, processor(s) 1024, battery (e.g., power source) 1026, a communication component 1028, and/or storage media or storage 1030, among others. Of course, other elements can be included in various implementations. Also, note that this description attempts to organize the elements into groups, such as layers, for purposes of explanation. The reader should understand that grouping may not be precisely accurate in all circumstances or may not be the only way to express the relationships of the elements. For instance, the multi-option boot loader 1014 could be illustrated next to the operating system 1012 or even on top of the operating system, rather than underneath. In another characterization, the multi-option boot loader 1014 could be described as part of the application layer 1004. As such, the intent of the illustration is to aid the reader in understanding the present concepts rather than to present a limiting architecture. Another way to consider the multi-option boot loader is that it can be the first instructions that run on the device at start-up. Once running, the multi-option boot loader can run other instructions.

From one perspective, device 1002 can be thought of as a computer. Examples of computers or devices can include traditional computing devices, such as personal computers, desktop computers, notebook computers, cell phones, smart phones, personal digital assistants, pad type computers, digital whiteboards, cameras, wearable devices, such as smart glasses, or any of a myriad of ever-evolving or yet to be developed types of computing devices.

Processor 1024 can execute data in the form of computer-readable instructions to provide a functionality. Data, such as computer-readable instructions and/or user-related data, can be stored on storage 1030, such as storage that can be internal or external to the computer. The storage can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

For purposes of explanation, in this document, storage 1030 may be referred to as primary storage 1030(1) and secondary storage 1030(2). Primary storage 1030(1) can be any built-in (e.g., included at the time of manufacture) storage, such as flash, hard drives, etc. Secondary storage 1030(2) can be any other storage such as storage added to the device by a seller or the end user, such as a multimedia card added to a multimedia port. Secondary storage can also include remote storage, such as cloud-based storage that can be accessed or utilized by the device. Note also that while the terms 'processor' and 'storage' are illustrated as distinct elements, there can be overlap. For instance, 'storage' as used here may include a dedicated controller. For instance, among other configurations, primary storage 1030(1) can be embodied as embedded multimedia controller (eMMC) storage that includes flash memory and a flash memory controller integrated on the same silicon die. Similarly, processor 1024 can have its own dedicated memory that can be considered part of storage 1030.

In some configurations, device 1002 can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices.

Generally, any of the functions described herein can be implemented using software, firmware, hardware (e.g., fixed-logic circuitry), manual processing, or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the components are platform-independent, meaning that they may be implemented on a variety of commercial computing platforms having a variety of processing configurations.

The multi-option boot loader 1014 can allow the user to select from multiple operating systems. For instance, at device power up, the multi-option boot loader 1014 can be the first instructions that run on the processor 1024. For instance, at device start-up, such as when the user pushes the power button, hardware 1016 can power up. The hardware (e.g., processor 1024) can locate the multi-option boot loader 1014, which can be stored at a specific location on the primary storage 1030(1). The hardware 1016 can validate a certificate of the multi-option boot loader 1014 based upon a certificate burned into the hardware 1016 (e.g., into an integrated circuit chip that includes the processor). In some implementations, this configuration can ensure that no other boot loaders run on the device. Stated another way, a certificate that is burned into the chip will validate a digital signature of the multi-option boot loader. If the signature passes (e.g., is validated), the multi-option boot loader is loaded. The multi-option boot loader can in turn validate individual operating systems, such as via their respective unique digital signatures. This aspect is discussed in more detail below relative to FIG. 12.

Stated another way, some implementations can employ a single multi-option boot loader (e.g., the multi-option boot loader is the only boot loader on the device). The single multi-option boot loader can be authenticated on the device and can then handle all of the operating systems. These configurations can (attempt to) guarantee the security of the device by preventing any other boot loader from launching on the device which could then install untrusted operating systems that could expose sensitive data, such as user data on the device.

The multi-option boot loader 1014 can cause a GUI to be presented to the user that explains that multiple operating systems are available to the user and allows the user to select an individual operating system. Examples of these GUIs are illustrated relative to FIGS. 1-9. Upon user selection, the multi-option boot loader can configure the device 1002 with a single operational operating system. Examples of these aspects are discussed below relative to FIGS. 11 and 12. Upon user selection, the multi-option boot loader 1014 can take various actions to configure the device for the user selected operating system.

The communication component 1028 can be manifest as cellular circuitry, other wireless circuitry, a modem, ports, etc. that can allow the device to communicate with other devices, such as over a network. The processor 1024 can cause the communication component 1028 to convey which operating system was installed on the device in operable form.

Figure 11:
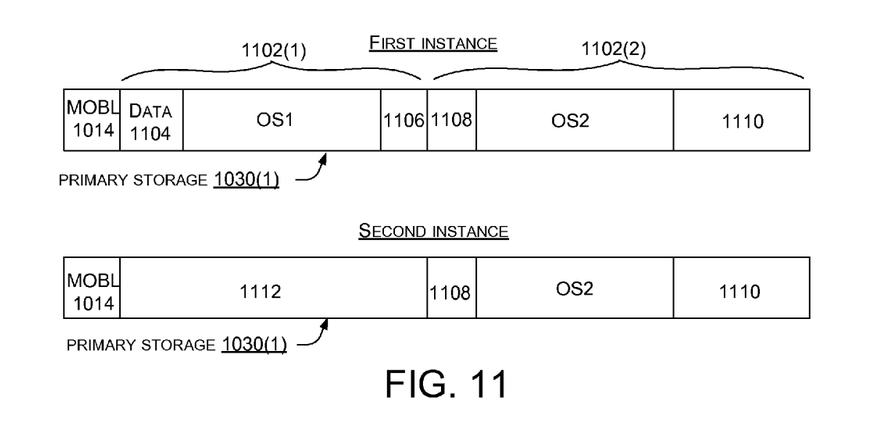
FIGS. 11-13 show additional details relating to some of the elements introduced relative to FIG. 10 in accordance with some implementations.

FIG. 11 illustrates a horizontal bar graph representation of storage space on primary storage 1030(1). The primary storage 1030(1) can be any persistent (e.g., non-volatile) storage, such as flash memory or a hard drive, among others. This example relates to two different operating systems 1012, designated as OS1 and OS2. For purposes of explanation and comparison's sake, the primary storage 1030(1) is shown at a 'first instance' and a subsequent 'second instance'.

The first instance shows the primary storage 1030(1) with two operable operating systems (OS1 and OS2) installed on the storage. More specifically, the primary storage 1030(1) includes the multi-option boot loader (MOBL) 1014. Further, the primary storage 1030(1) is organized into two hard partitions 1102(1) and 1102(2). The first hard partition 1102(1) is dedicated to OS1, configuration data 1104 associated with OS1, and storage for user data at 1106. Similarly, the second hard partition 1102(2) is dedicated to OS2, configuration data 1108 associated with OS2, and storage for user data at 1110. For purposes of explanation, one way of considering a hard partition is that from the perspective of the operating system installed within the hard partition, the hard partition defines the extent of the storage (e.g., the operating system is not aware that the storage extends beyond the hard partition).

The multi-option boot loader 1014 can run and allow the user to select one of the two operating systems (see for example FIG. 1). The multi-option boot loader 1014 could then reformat the primary storage 1030(1) to produce the configuration evidenced at the second instance. Specifically, the multi-option boot loader 1014 can delete the non-selected operating system (in this example OS1) and reformat that storage space for user-related storage as indicated at 1112. In some configurations, the multi-option boot loader 1014 can operate cooperatively with the selected operating system to reformat the storage for additional user space.

Figure 12:
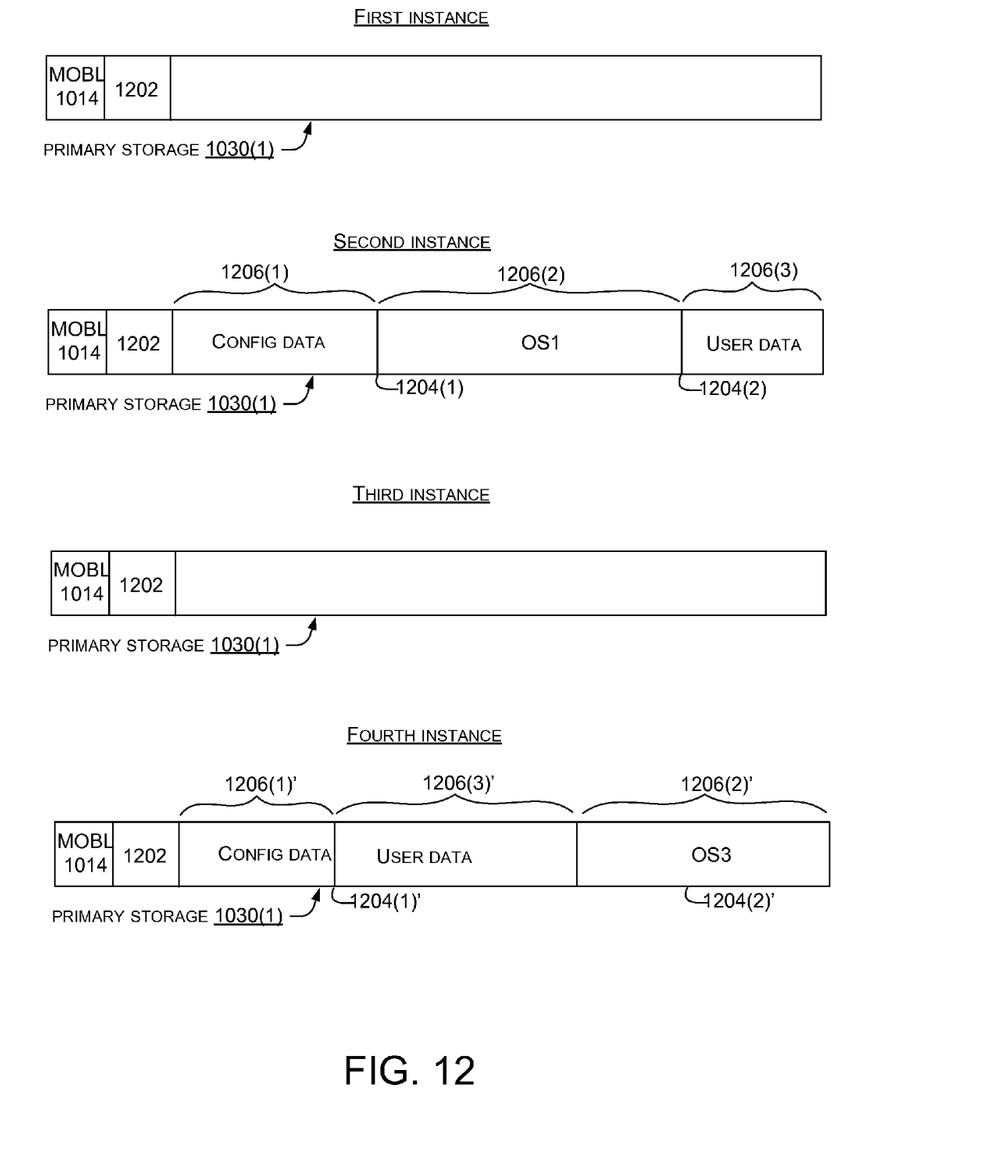

FIG. 12 shows another implementation of primary storage 1030(1) that allows the user to select an operating system. In this case, the primary storage includes the multi-option boot loader 1014 and compressed forms of multiple operating systems in an OS vault 1202. In some implementations, the compressed operating systems are stored in binary form along with configuration data for each operating system. While not expressly illustrated, in this example, there are three compressed inoperable operating systems (OS1-OS3) and associated configuration data stored in OS vault 1202. These aspects are discussed in more detail below relative to FIG. 13.

Recall that as mentioned in the discussion above relative to FIG. 10 at device start-up, the multi-option boot loader 1014 can be authenticated. Also as mentioned above, the multi-option boot loader can allow the user to select an individual OS to run on the device. The multi-option boot loader 1014 can configure the primary storage 1030(1) for the selected operating system. For instance, the multi-option boot loader 1014 can use configuration data from the OS vault 1202 that is specific to the selected operating system to install soft partitions 1204(1) and 1204(2) on the primary storage. The multi-option boot loader 1014 can know or have access to the beginning and ending addresses of each operating system in the OS vault 1202. In some cases, the start and stop addresses of the individual operating systems in the OS vault are listed in the OS vault and can be read by the multi-option boot loader. The multi-option boot loader can then extract the selected operating system from the OS vault 1202 and validate the certificate for that operating system.

If the certificate for the selected operating system passes, the multi-option boot loader 1014 can write some of the configuration data associated with the selected operating system to a portion of the primary storage 1030(1) as indicated at 1206(1). Also, once the selected operating system is validated, the multi-option boot loader 1014 can write the validated OS to the OS partition (e.g., as defined between soft partitions 1204(1) and 1204(2)) as indicated at 1206(2). The multi-option boot loader 1014 can configure the user storage as indicated at 1206(3).

The multi-option boot loader 1014 can accomplish this configuration of the primary storage 1030(1) in a manner that the entire boot chain can be secure and trusted. First, the device hardware 1016 can check the multi-option boot loader 1014. Second, the multi-option boot loader 1014 can ensure that the operating system and any remaining components are authored and signed by a trusted entity. Considered from one perspective, the multi-option boot loader 1014 can provide a unified extensible firmware interface (UEFI) secure boot loader functionality for each of the available operating systems as part of its overall functionality.

To summarize, at initial start-up the multi-option boot loader 1014 can run and allow the user to select an individual operating system to run on the device (see for example FIG. 3). For purposes of example, assume that the user selects OS1. Responsively, the multi-option boot loader 1014 can organize the primary storage 1030(1) for OS1 and install OS1 on the storage in an operable form from the compressed binary form of OS1 in the OS vault. In this case (as shown in the second instance of FIG. 12), the multi-option boot loader 1014 can install soft partitions 1204(1) and 1204(2) as specified by OS1 to define where configuration data is located (indicated at 1206(1)), the operating system is located (indicated at 1206(2)), and where storage allocated to user data is located (indicated at 1206(3)). As used herein, soft partitions relate to the file system format related to an individual operating system. From one perspective, the soft partitions can be analogized to file folders.

The multi-option boot loader 1014 can install an operable form of OS1 sector by sector from the compressed form in the operating system vault 1202 to the storage portion 1206(2). At this point, OS1 can operate normally (e.g., as if it were the only operating system on the device) and does not need to be aware of the presence of the OS vault 1202 on the primary storage 1030(1). In fact, some implementations are configured so that the operable OS cannot access the OS vault (e.g., the other inoperable operating systems or their configuration data). As such, secure information associated with one operating system is protected from other operating systems and vice versa.

The operating system specific configuration data stored at 1206(1) (introduced above relative to FIG. 11 at 1104 and 1108) can be thought of as including provisioning data and/or user settings. Provisioning data can include information about modem setup, calibration data, and/or NV items, among others. Thus, the configuration data can be difficult to accurately illustrate, since the configuration data can include both the partition layout for the operating system as well as other configuration data, such as calibration data, that the multi-option boot loader 1014 can write to the partitions. Note that the provisioning data can be unique to a specific operating system. As such, provisioning data can be stored relative to its respective operating system as part of the respective configuration data. This configuration data can be unknown and inaccessible to the other operating systems. As mentioned above relative to FIG. 10, drivers 1018 can be operating system specific. As such, in some instances, the configuration data 1104 for each operating system can include drivers specific to that operating system. These drivers can be kept inaccessible to the other operating systems.

Note that when the primary storage 1030(1) is configured as illustrated at the second instance, the multi-option boot loader may reboot the device to run OS1.

Looking again at FIG. 12, the third instance can result from a scenario where the user elects to change from the selected operating system to one of the other available operating systems (see for example FIGS. 5-6). (In this case, assume that the user selected OS3). In the transition from the second instance to the third instance, configuration data, such as the user's personal settings, OS specific drivers, etc. can be saved to the OS vault 1202. Thus, this data can be available in the event that the user decides at a subsequent time to return to OS1. If there is other user data that is stored on the primary storage that may be lost due to the operating system change, the multi-option boot loader 1014 can take actions, such as showing the user how to back up the other user data, such as to secondary storage 1030(2) (see FIGS. 7 and 10).

The fourth instance shows that the multi-option boot loader 1014 has reformatted the primary storage 1030(1) for OS3 which is now installed and operable. Note that some implementations may include more and/or different soft partitions 1204(1)' and 1204(2)' than are illustrated here, but those implementations are consistent with the concepts explained above and below. For instance, two soft partitions are shown in both the second instance and the fourth instance for simplicity, but in other implementations, OS2 and OS3 may specify different numbers of partitions. Note that when the primary storage 1030(1) is configured as illustrated at the fourth instance, the multi-option boot loader 1014 may reboot the device to run OS3. In this case, the configuration data is designated as 1206(1)', OS3 is designated at 1206(2)', and user data is designated as 1206 (3)'.

Note that in this implementation, in the first instance no operating system is installed on the primary storage 1030(1) in operable form before the user selection. However, other implementations can be distributed with an individual operating system installed in operable form on the primary storage 1030(1) in a default configuration. If the user selects that operating system, it is ready to go. If the user selects a different operating system, then the default operating system can be removed and the process started again at the 'first instance' of FIG. 12.

Note that some implementations can check various parameters before proceeding with an operating system change. For instance, these implementations can check a battery level of the device. The operating system change may only be started if the battery level is above a defined threshold, such as 40%, to ensure that the battery does not run out during the operating system installation process. Further, the multi-option boot loader can be configured to return the primary storage to a specific configuration if the operating system installation process is interrupted. For instance, the user could pull the battery out while the multi-option boot loader is converting the primary storage from the first instance to the second instance. Upon restoration of power, the multi-option boot loader could return the device to the configuration of the first instance (e.g., no operational operating system or associated storage configuration). The multi-option boot loader could then start the process again (e.g., allow the user to select an operating system or restart configuring the primary storage and installing an operational version of the selected operating system).

Note that during manufacturing, the device can be repeatedly booted into each operating system for testing, calibrating, storing NV items, NVM items, radio, DPP, etc. at the manufacturing facility (e.g., factory) or another facility. For example, the device could be cycled through the first, second, third, and forth instances multiple times. The present implementations can prevent each operational operating system from corrupting data owned by the other (e.g., inoperable) operating systems during manufacturing. For example, OS1 cannot boot and delete the install partitions for OS2 and OS3 and/or access and/or write over various keys and certificates relating to the inoperable operating systems.

In summary, some implementations of the single multi-option boot loader can generate GUIs that allow the user to select an individual operating system for operation on the device from a list of available compressed operating systems. The single multi-option boot loader can provide a UEFI compliant boot loader functionality for each of the operating systems that are included on the device. Thus, the single multi-option boot loader can configure the primary storage and install the selected operating system while maintaining device security and protecting the inoperable operating systems and their configuration data.

Figure 13:
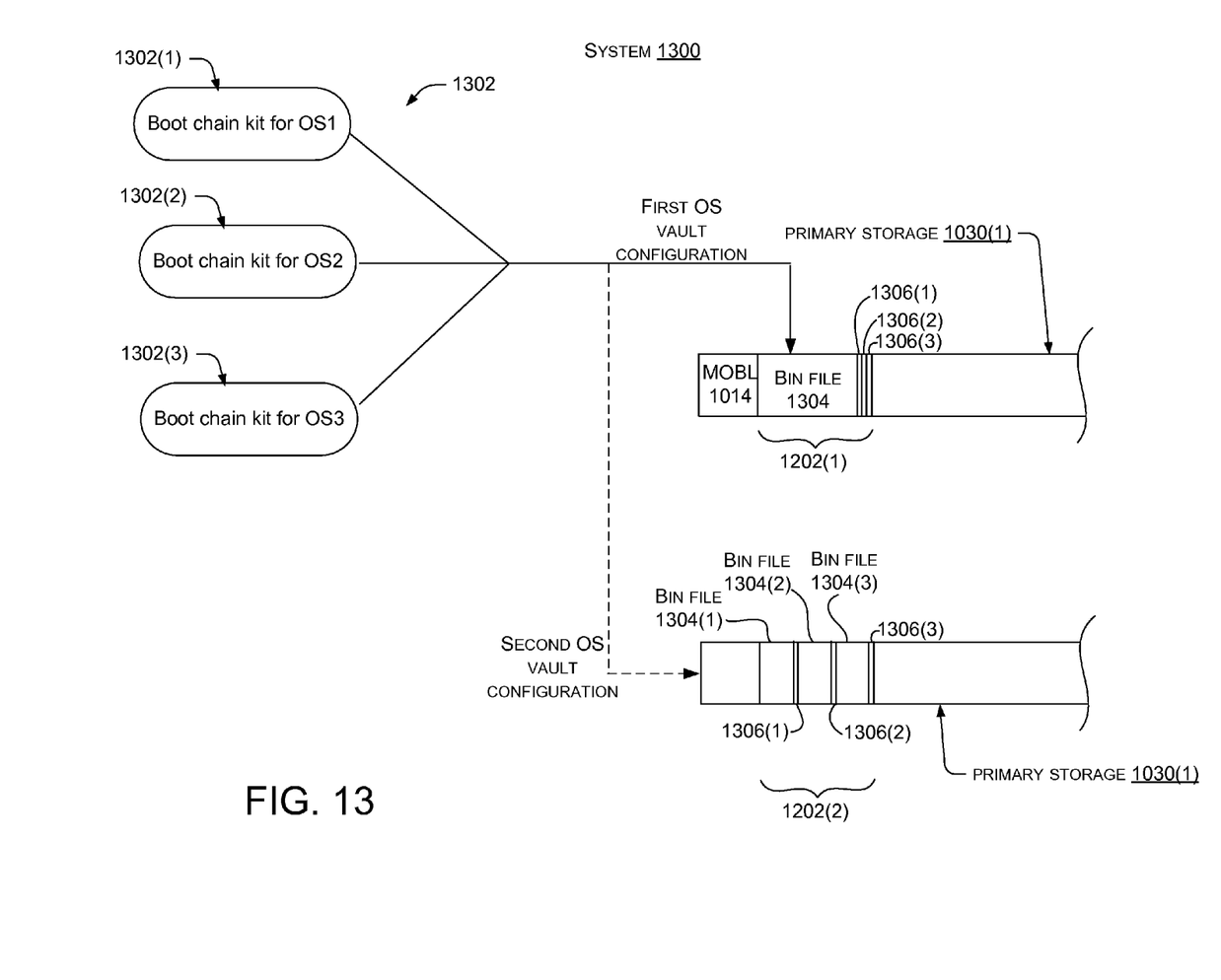

FIG. 13 shows a system 1300 configured to create the OS vault 1202. Two OS vault configurations are shown as OS vault 1202(1) and 1202(2). The first OS vault configuration is shown with a solid line and the second OS vault configuration is distinguished with a dotted line. Recall from the discussion above relative to FIG. 12 that in this instance, the OS vault contains a compressed form of three operating systems OS1, OS2, and OS3. Of course, while three operating systems are utilized in this implementation, other implementations can utilize two operating systems or four or more operating systems. The system can utilize a boot chain kit 1302 (in this case involving elements 1302(1), 1302(2), and 1302(3) for each operating system OS1, OS2, and OS3, respectively). In the first configuration, the boot chain kit 1302 can be utilized to make a single compressed binary file 1304. Any configuration data or other data that is specific to an individual operating system can be stored in a soft partition 1306(1)-1306(3) dedicated to the respective OS1-OS3. The compressed binary file can include a listing of start and stop addresses for each operating system.

In the second configuration, each operating system (OS1-OS3) is stored in compressed form in its own dedicated binary file 1304(1)-1304(3), respectively. In the illustrated configuration, the binary file for each OS is located adjacent to the configuration data in soft partitions 1306(1)-1306(3) for that OS. In other configurations, the OS binary files can be grouped together and the configuration data can be grouped together.

Example Techniques

Figure 14:
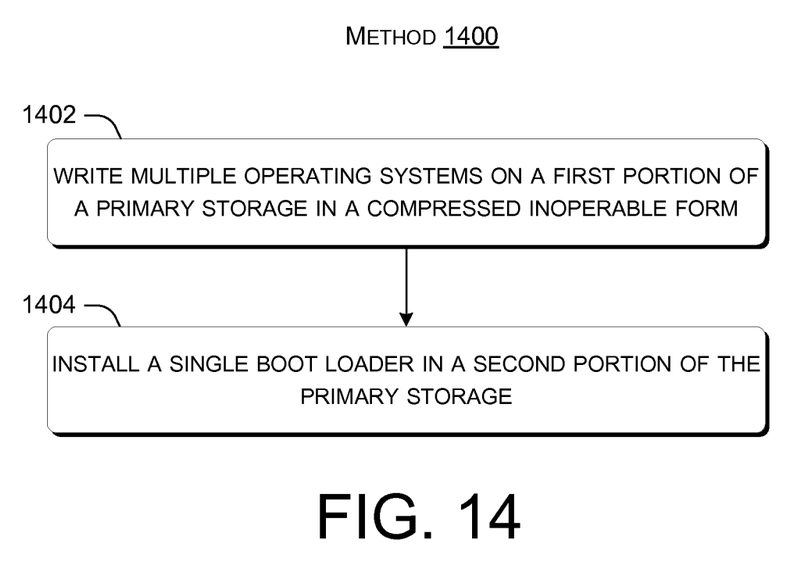
FIGS. 14-15 are flow diagrams of multiple operating system methods in accordance with some implementations.

FIG. 14 illustrates a flowchart of a multi-operating system selection technique or method 1400.

At block 1402 the method can write multiple operating systems on a first portion of a primary storage in a compressed inoperable form. In some cases, the inoperable form is a single binary file that contains all of the multiple compressed inoperable operating systems. In other cases a binary file is dedicated to each compressed inoperable operating system. Of course, while binary files are utilized in this example, other compressed file configurations can be utilized to store the inoperable forms of the multiple operating systems.

At block 1404 the method can install a single boot loader in a second portion of the primary storage. The single boot loader can be configured to install any one of the multiple operating systems in an operable form on a third portion of the primary storage. Addresses in the first portion of the primary storage associated with others of the multiple operating systems can be protected from being read or written by the operational operating system.

Figure 15:
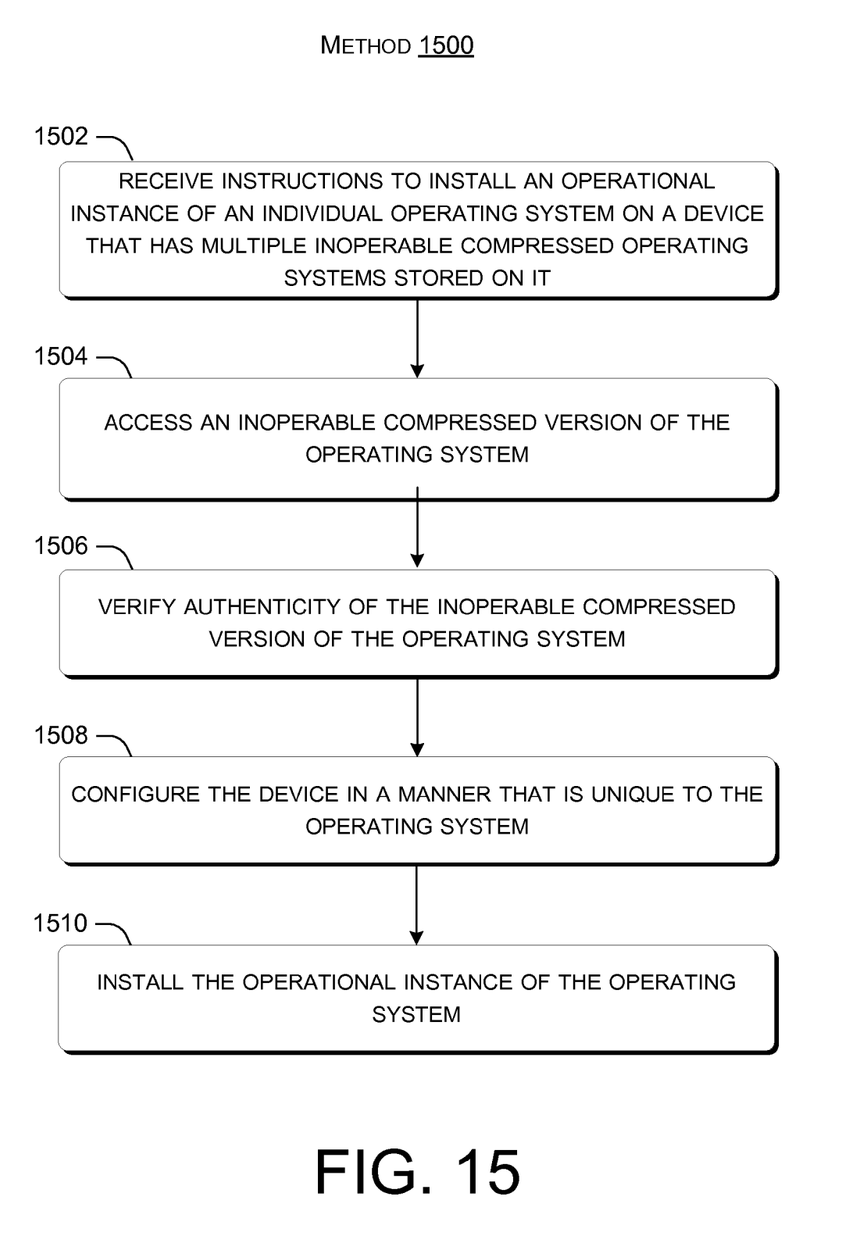

FIG. 15 illustrates a flowchart of a multi-operating system selection technique or method 1500.

At block 1502 the method can receive instructions to install an operational instance of an individual operating system on a device that has multiple inoperable compressed operating systems stored on it (e.g., the device).

At block 1504 the method can access an inoperable compressed version of the operating system. In some implementations, the inoperable compressed version can be stored as a dedicated file. In other implementations, the inoperable compressed version can be part of a single file that also includes inoperable compressed versions of other non-selected operating systems.

At block 1506 the method can verify authenticity of the inoperable compressed version of the operating system. For instance, the verifying can entail checking a digital signature of the inoperable compressed form.

At block 1508 the method can configure the device in a manner that is unique to the operating system. In some cases the configuring can entail installing soft partitions on the primary storage in a manner specified by (and/or for) the selected operating system.

At block 1510 the method can install the operational instance of the operating system. In some cases, the method may send a notification indicating which operating system was installed in operational form on the device. For instance, the notification can be sent to a manufacturer of the device or a service provider, such as a cellular service provider associated with the device. Among other uses, the notification can be utilized for billing purposes. For instance, a cellular service provider may sell smart phones that have a first operating system from a first entity and a second operating system from a second entity. The cellular service provider may gather the notifications and provide payments to the first and second entities based upon the number of smart phones sold that are running their respective operating systems. The payment could be a one-time payment or could be a periodic payment. For instance, the user might select the first operating system for a period of time and then switch to the second operating system. In that case, each entity could be compensated for the use of their operating system. In an alternative configuration, the notification could be sent to the manufacturer and the manufacturer could compensate the first or second entity based upon the notification.

The described methods can be performed by the systems and/or devices described above relative to FIGS. 1-13, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computing device causes the computing device to perform the method.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device comprising:
non-volatile primary storage having multiple compressed operating systems stored thereon in inoperable form with multiple respective digital signatures for the multiple compressed operating systems; and
a processor configured to execute a boot loader that is configured to:
receive a user selection of a selected operating system;
verify the selected operating system using an individual digital signature that is stored on the non-volatile primary storage for the selected operating system;
install a file folder structure on the non-volatile primary storage in a configuration specific to the selected operating system;
install the selected operating system in an operable form on the non-volatile primary storage relative to the file folder structure;
retain another compressed operating system in inoperable form on the non-volatile primary storage with the selected operating system in the operable form;
while the selected operating system is installed in the operable form and the another compressed operating system is stored in the inoperable form on the non-volatile primary storage, receive another user selection requesting a change from the selected operating system to the another compressed operating system; and
responsive to the another user selection, remove the operable form of the selected operating system from the non-volatile primary storage and install the another compressed operating system in operable form on the non-volatile primary storage.

2. The device of claim 1, wherein the boot loader is the only boot loader on the device.

3. The device of claim 1, wherein the boot loader comprises instructions that run on the processor before other instructions of the selected operating system.

4. The device of claim 1, wherein the boot loader is configured to:
install the operable form of the another compressed operating system in a soft partition on the non-volatile primary storage.

5. The device of claim 1, wherein the boot loader is unified extensible firmware interface (UEFI) compliant for each of the multiple compressed operating systems.

6. The device of claim 1, wherein the boot loader is further configured to:
maintain an operating system vault on the non-volatile primary storage, the operating system vault having the multiple compressed operating systems stored thereon in inoperable form; and
prevent the operational form of the selected operating system from accessing the operating system vault.

7. The device of claim 1, wherein the device comprises a smart phone, a tablet, a wearable smart device, or a personal computer.

8. The device of claim 1, wherein the processor is further configured to send a message that indicates that the selected operating system was installed in an operable form.

9. The device of claim 1, wherein the non-volatile primary storage comprises factory installed flash storage and wherein the inoperable forms of the multiple compressed operating systems are stored as a single binary file on the factory installed flash storage.

10. The device of claim 9, wherein the single binary file is burned onto the factory installed flash storage during manufacture of the device.

11. The device of claim 1, wherein the device is further configured to validate a digital signature of the boot loader before loading the boot loader on the device.

12. The device of claim 1, wherein the selected operating system is not aware of the another compressed operating system on the non-volatile primary storage.

13. A device comprising:
a display;
a processor; and persistent storage storing:
multiple operating systems in compressed form and multiple respective digital signatures for the multiple operating systems; and
computer-readable instructions which, when executed by the processor, cause the processor to:
while an operational form of a selected operating system of the multiple operating systems is installed on the persistent storage, cause a graphical user interface (GUI) to be presented on the display that lists another operating system of the multiple operating systems that is stored in compressed form on the persistent storage;
while the operational form of the selected operating system is installed on the persistent storage, receive, via the GUI, a user input identifying the another operating system stored in the compressed form on the persistent storage; and
responsive to the user input received via the GUI, delete the operational form of the selected operating system from the persistent storage and install an operational form of the another operating system on the persistent storage while retaining a compressed form of the selected operating system on the persistent storage.

14. The device of claim 13, wherein the computer-readable instructions, when executed by the processor, cause the processor to:
obtain configuration data for the another operating system and write the configuration data to the persistent storage with the operational form of the another operating system.

15. The device of claim 14, wherein the at least some of the configuration data relates to user settings.

16. The device of claim 13, wherein the computer-readable instructions, when executed by the processor, cause the processor to:
responsive to the user input received via the GUI, install one or more soft partitions on the persistent storage and install the operational form of the another operating system in an individual soft partition.

17. A method comprising:
storing a compressed version of a first operating system and a compressed version of a second operating system in an operating system vault on a persistent storage device of a computing device;
receiving a first selection of the first operating system;
responsive to the first selection, installing an operable version of the first operating system on the persistent storage device while retaining the compressed version of the second operating system in the operating system vault on the persistent storage device;
while the operable version of the first operating system is installed on the persistent storage device, preventing the operable version of the first operating system from accessing the operating system vault on the persistent storage device;
receiving a second selection of the second operating system; and
responsive to the second selection, deleting the operable version of the first operating system from the persistent storage device, installing an operable version of the second operating system on the persistent storage device, retaining the compressed version of the first operating system in the operating system vault on the persistent storage device, and preventing the operable version of the second operating system from accessing the operating system vault.

18. The method of claim 17, performed by a boot loader of the computing device.

19. The method of claim 18, wherein the computing device is a mobile computing device and the persistent storage device is a factory-installed flash storage device, the method further comprising:
delivering the mobile computing device to an end user with both the compressed version of the first operating system and the compressed version of the second operating system stored in the operating system vault without any operable operating system version installed on the factory-installed flash storage device.

20. The method of claim 17, wherein at least one of the first selection or the second selection is received via a graphical user interface.

* * * * *